(12) United States Patent
Laraqui (10) Patent No.: US 6,466,583 B1
(45) Date of Patent: Oct. 15, 2002

(54) INTEGRATION OF SNMP AND CMIP

(75) Inventor: Kim Laraqui, Stockholm (SE)

(73) Assignee: Telia AB, Farsta (SE)

( * ) Notice: Subject to any disclaimer, the term of this patent is extended or adjusted under 35 U.S.C. 154(b) by 0 days.

(21) Appl. No.: 09/147,530

(22) PCT Filed: Jun. 12, 1997

(86) PCT No.: PCT/SE97/01032

§ 371 (c)(1),
(2), (4) Date: May 18, 1999

(87) PCT Pub. No.: WO98/02993

PCT Pub. Date: Jan. 22, 1998

(30) Foreign Application Priority Data

Jul. 15, 1996 (SE) ................................................ 9602777

(51) Int. Cl.$^7$ ................................................ H04J 3/16
(52) U.S. Cl. ................................ 370/465; 370/395.52
(58) Field of Search ................................ 370/465, 466, 370/467, 469, 471, 476, 389, 395.1, 400, 401, 352, 395.5, 395.51, 395.52; 709/223, 230, 231

(56) References Cited

U.S. PATENT DOCUMENTS

| | | | |
|---|---|---|---|
| 5,263,137 A | | 11/1993 | Anezaki |
| 5,452,433 A | * | 9/1995 | Nihart et al. ................ 709/223 |
| 5,561,769 A | * | 10/1996 | Kumar et al. ................ 709/202 |
| 5,710,908 A | * | 1/1998 | Man ........................... 709/230 |
| 5,781,544 A | * | 7/1998 | Daane ......................... 370/389 |
| 5,931,911 A | * | 8/1999 | Remy et al. ................. 709/223 |
| 5,960,176 A | * | 9/1999 | Kuroki et al. ............... 709/223 |
| 6,101,538 A | * | 8/2000 | Brown ......................... 709/223 |
| 6,219,718 B1 | * | 4/2001 | Villalpando ................. 709/317 |

FOREIGN PATENT DOCUMENTS

WO  WO 94/23514  10/1994

OTHER PUBLICATIONS

R. Zihang, et al., Annales des télécommunications, vol. 49, No. 1–2, pp. 17–26, "Network Management Integrating SNMP/CMIP Protocol Implementations", 1994.
B. Moore, et al., IEEE Network Operations and Management Symposium, pp. 257–267, "CMIP/SNMP Integration Prototype", 1994.
M. Rose, Request for Comments 1085, pp. 1–32, "ISO Presentation Services on Top of TCP/IP–Based Internets", Dec., 1988.
U. Warrier, et al., Request for Comments 1095, pp. 1–34, The Common Management Information Services and Protocol Over TCP/IP (CMOT), Apr., 1989.

(List continued on next page.)

Primary Examiner—Dang Ton
Assistant Examiner—Brian Nguyen
(74) Attorney, Agent, or Firm—Oblon, Spivak, McClelland, Maier & Neustadt, P.C.

(57) ABSTRACT

Many systems deployed by telecommunications operators will, in the future, include both Simple Network Management Protocol (SNMP) and Common Management Information Protocol (CMIP) management mechanisms. The disclosed system solution is a mechanism which enables CMIP to be implemented directly on top of SNMP. By using this mechanism, security and administrative mechanisms that are included in SNMP version 2, or SNMP version 1.5, can be reused for CMIP. This enables telecommunications operators to actively fight the network complexity inflation that is currently placing a heavy burden on telecommunications networks.

11 Claims, 5 Drawing Sheets

OTHER PUBLICATIONS

S. Mazumdar, et al., International Symposium on Integrated Networking, pp. 377–388, "Design of Protocol Independent Management Agent to Support SNMP and CMIP Queries", Apr., 1993.

J.T. Park, et al., IEEE International Workshop on Systems Management, pp. 145–154, "The Integration of OSI Network Management and TCP/IP Internet Management Using SNMP", Apr., 1993.

* cited by examiner

INTEGRATION OF SNMP AND CMIP

BACKGROUND OF THE INVENTION

1. Field of the Invention

The present invention relates to protocol architectures, for use in network management of telecommunications systems, methods of managing telecommunications networks and telecommunications network management systems.

2. Discussion of the Background

For the avoidance of doubt, it should be noted that network management systems, in telecommunications, refer to the equipment, software, and methods used to control the technical operation of a telecommunications network. Inventions relating to network management systems are based on telecommunications technology and invariable have a direct and real effect on the operation of telecommunications equipment such as telephone exchanges, ATM systems, intelligent networks, and the like.

Most computer systems, including those that control network elements implementing SDH (Synchronous Digital Highway), ATM (Asynchronous Transfer Mode), SS7 (ITU-T Signalling No. 7) and others, will, in the future, be equipped with management facilities conforming to SNMP (the Internet Simple Network Management Protocol). This is also true for most CPE (Customer Premises Equipment). Similarly, many of the aforementioned computer systems will be equipped with ISO-oriented management protocols, in particular CMIP, (ISO/ITU Common Management Information Protocol). It is likely that CMIP and SNMP will coexist for a long period of time. It is also likely that SNMP will, in many cases, be used to implement point-to-point, low-level, element management. CMIP will be deployed as an instrument to coordinate those SNMP-based management systems on a network, service and business, wide level.

SUMMARY OF THE INVENTION

The present invention is intended to facilitate a sharing of communication resources between SNMP and CMIP. Many systems deployed by telecommunications operators will, in the future, consist of both SNMP and CMIP management mechanisms. An example of such a system is the Telia City Service's ATM network. The systems solution, of the present invention, proposes a mechanism which will enable CMIP to be implemented directly on top of SNMP. By using this mechanism, security and administrative mechanisms that are included in SNMPv2, or SNMPv1.5, can be reused for CMIP. This will enable telecommunications operators to actively fight the network complexity inflation that is currently placing a heavy burden on telecommunications networks.

An octet-oriented approach has been defined by Marshall Rose (Internet RFC 1185) for using data generated by BER and then feeding this data directly into TCP. However, this method is purely a data transport technique and does not cater for utilization of administrative and security frameworks and resources already in place for SNMP.

According to a first aspect of the present invention, there is provided a telecommunications system, including a network management centre and at least one network element, in which network management data is transmitted, at least partially, over a link(s) employing CMIP and SNMP, characterised in that SNMP based management protocols are reused as a transport mechanism for CMIP PDUs.

Said SNMP may have a security and administrative framework that is reused for said CMIP.

After serialisation of CMIP PDUs into octet strings, the octet strings may be encapsulated into SNMP PDUs for transmission.

The octet strings may include a MIB tree reference.

Said telecommunications management centre may include a serializer adapted to transform CMISE/ROSE ASN.1 data structures to a string of octets.

Said telecommunications system may include at least one network management system, said network management centre may transmit said network management data to said at least one network element via said at least one network management system, and said network management data may be transmitted between said network management centre and said network management system using either CMIP, or SNMP.

Said telecommunications system may include a plurality of network management systems.

Said telecommunications system may include a plurality of network elements, and said network elements may include SDH, ATM, SS7.

Said telecommunications system may include a first and second CMISE, said first CMISE may be adapted to establish an association with said second CMISE, and said association may specify a presentation context.

Said presentation context may be ROSE.

Once said association is established, CMIP may work on top of ROSE, which may work on top of a serializer that transforms ASN.1 data structures from CMISE/ROSE to a string octet according to BER.

Strings of octets produced by said serializer may be conveyed to a local SNMP interface which can be either a manager, or an agent.

Said octet strings may include a MIB-tree reference pertaining to said octet strings' origin, said MIB-tree reference may function as an entry to a set of variables and tables acting as a repository for CMISE/ROSE generated octet strings.

When an initiating CMISE side of a manager/agent border exchange service has identified a MIB-tree reference, pertaining to a particular association and invocation, it may cause a generated octet string to be written into a MIB variable/table entry on the other side of a manager/agent border exchange service.

Said network element may be an ATM switch.

According to a second aspect of the present invention, there is provided, a protocol architecture, for transmission of network management data using both CMIP and SNMP, characterised in that SNMP based management protocols are reused as a transport mechanism for CMIP.

The SNMP's security and administrative framework may be reused for CMIP.

CMIP PDUs may be serialised, into octet strings, and encapsulated into SNMP PDUs.

The octet strings may include a MIB tree reference.

The process of serialisation may transform CMISE/ROSE ASN.1 data structures into a string of octets.

A first CMISE may be adapted to establish an association with a second CMISE, and said association may specify a presentation context.

Said presentation context may be ROSE.

CMIP may work on top of ROSE, which may work on top of the process of serialization that transforms ASN.1 data structures from CMISE/ROSE to a string octet, according to BER.

Strings of octets produced by said process of serialization may be conveyed to a local SNMP interface which can be either a manager, or an agent.

Said octet strings may include a MIB-tree reference pertaining to said octet strings' origin, and said MIB-tree reference may function as an entry to set of variables and tables acting as a repository for CMISE/ROSE generated octet strings.

An MIB may be linked to a layer 2 service provider via a first protocol stack which may include CMISE/CMIP and ROSE.

Said first protocol stack may include SMASE.

An MIB may be linked to a layer 2 service provider via a second protocol stack which includes SNMP, UDP and IP.

Said first protocol stack may include said second protocol stack.

According to a third aspect of the present invention, there is provided a method of managing a telecommunications system, said telecommunications system, including a network management centre and at least one network element, in which network management data is transmitted, at least partially, over a link(s) employing CMIP and SNMP, said method characterised by reusing SNMP based management protocols as a transport mechanism for CMIP PDUs.

BRIEF DESCRIPTION OF THE DRAWINGS

Embodiments of the invention will now be described, by way of example, with reference to the accompanying drawings, in which.

DETAILED DESCRIPTION OF THE PREFERRED EMBODIMENTS

To facilitate an understanding of the present invention, a glossary of the abbreviations used in this patent specification are set out below:

ACSE: Association Control Service Element
AP: Application Process
ASN.1: Abstract Syntax Notation No. 1
ATM: Asynchronous Transfer Mode
BER: Basic Encoding Rule
CMIP: Common Management Information Protocol (ISO/ITU)
CMISE: CMIP Service Element
CPE: Customer Premises Equipment
IP: Internet Protocol
ISO: International Standards Organisation
ITU: International Telecommunications Union
MIB: Management Information Base
NMC: Network Management Centre
NMS: Network Management System
OID: Object ID
OSI: Open Systems Interconnect
PDU: Protocol Data Unit
ROSE: Remote Operations Service Element
SDH: Synchronous Digital Highway
SMASE: Service Management and Administration Entity?
SNMP: Simple Network Management Protocol (Internet)
SS7: ITU Signalling System No. 7
TCP: Transmission Control Protocol
UDP: User Datagram Protocol (Internet)
VP: Virtual Path
vpCTPBid: VP Connection Termination Point Bidirectional
VPI: Virtual Path Identifier The embodiment of the present invention described here, relates to the Telia City Services ATM network.

Figure 1:
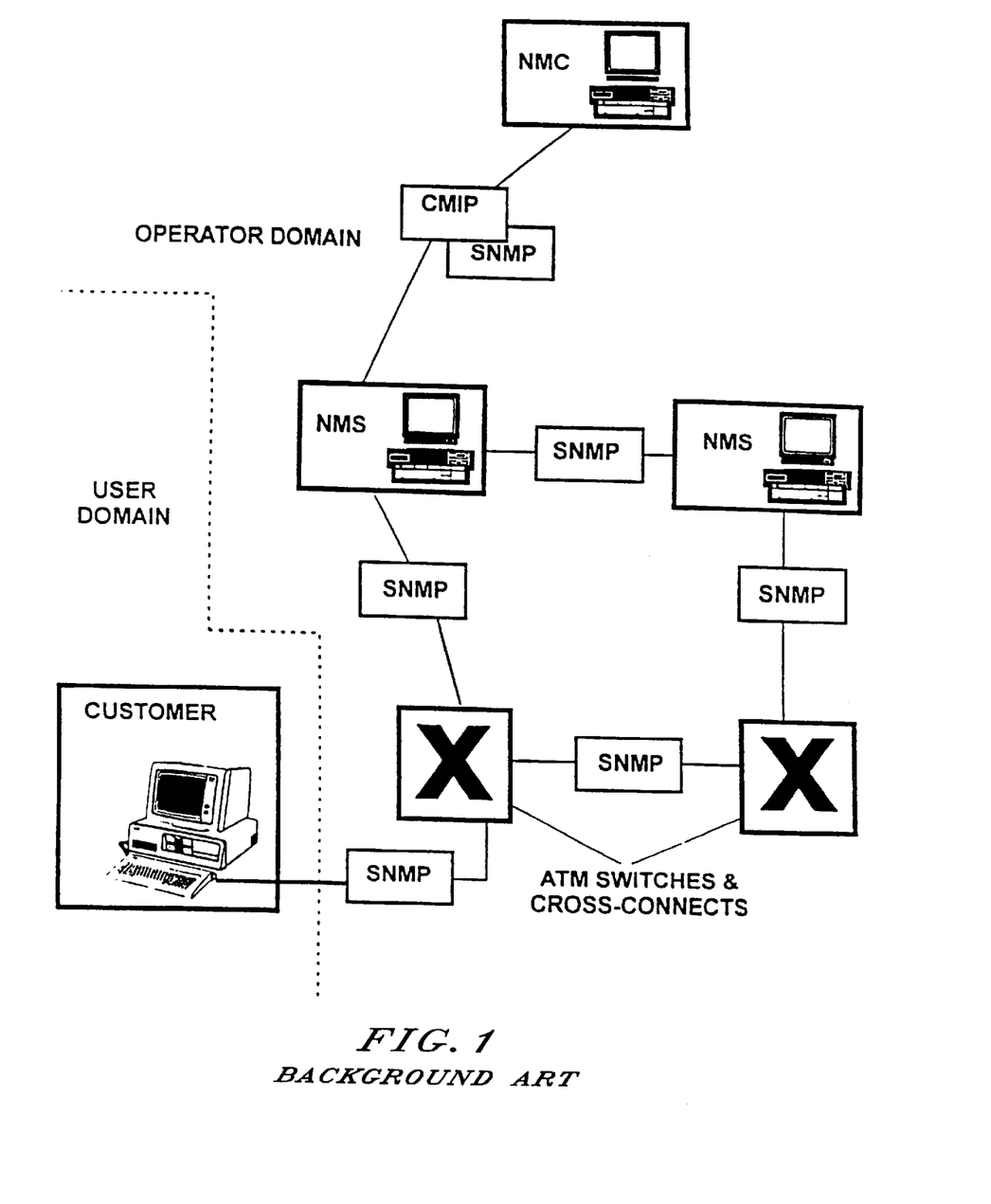
FIG. 1 illustrates a known architecture for network management of a telecommunications network.

CMIP will be introduced into telecommunications networks to coordinate lower level NMSs and will start to penetrate the management network from above. Referring now to FIG. 1, there is illustrated a typical telecommunications management network, which can conceptually be split into an operator domain and a user domain. The network management centre, NMC, communicates with network management systems, NMS, by CMIP, or SNMP. In many cases both management protocols, CMIP and SNMP, will coexist. The NMSs will communicate with each other and ATM switches and cross-connects using SNMP. Again, communications within the ATM network, between ATM switches, cross-connects and customers will use SNMP.

Most computer systems, including those that control network elements implementing SDH, ATM, SS7 and others, will in the future be equipped with management facilities conforming to SNMP. This is also true for most CPE. Similarly, many of the aforementioned computer systems will be equipped with ISO-oriented management protocols, in particular CMIP. It is likely that CMIP and SNMP will coexist for a long period of time. It is also likely that SNMP will, in many cases, be used to implement point-to-point low-level element management. CMIP will be deployed as an instrument to coordinate those SNMP-based management systems on a network, service and business, wide level.

Thus, it will be necessary for SNMP and CMIP to coexist in an efficient manner which does not lead to network complexity inflation.

Figure 2:
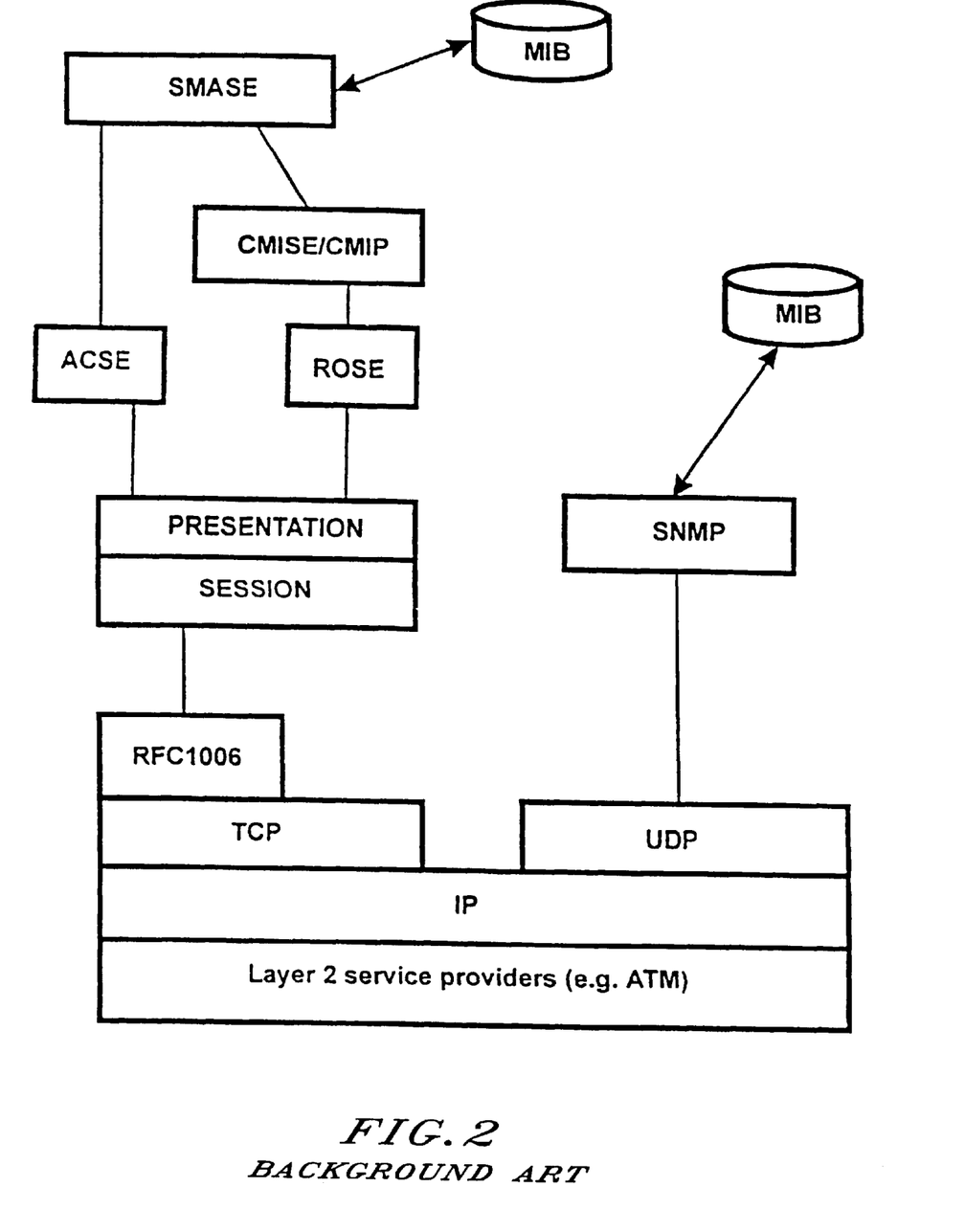
FIG. 2 illustrates a known protocol architecture for use in a network management system.
Figure 3:
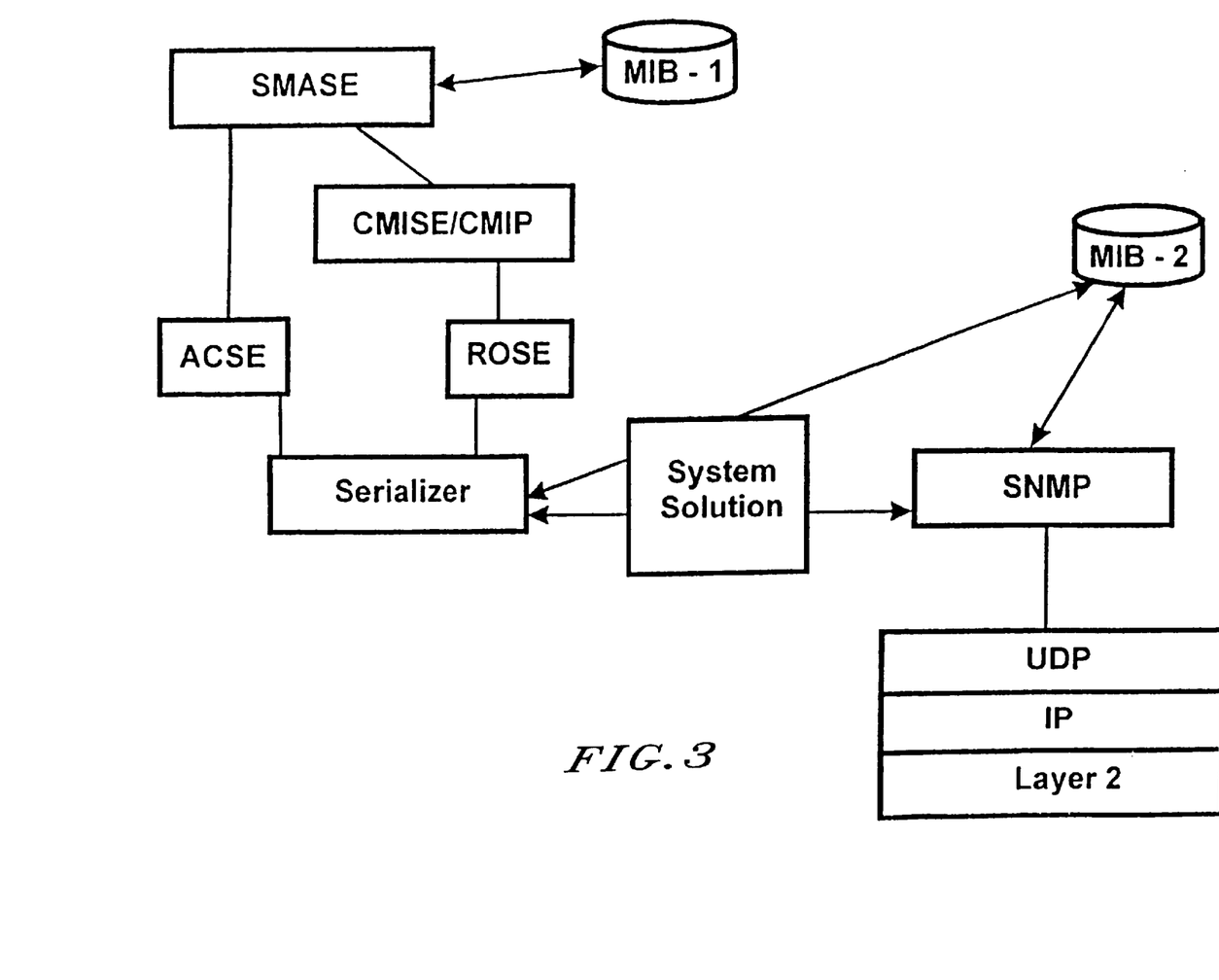
FIG. 3 illustrates a protocol architecture according to the present invention.

Instead of requiring a totally separate protocol stack for CMIP, as opposed to the infrastructure already available through SNMP, the systems solution of the present invention provides a method of reusing the ubiquitous SNMP-based management protocols as a transport mechanism for CMIP, see FIGS. 2 and 3, which contrast the traditional protocol architecture used in network management systems with the protocol architecture of the present invention.

Referring first to FIG. 2, there is illustrated a traditional protocol architecture used in network management systems. On the one hand, a MIB links through to a SMASE and thence to an ACSE, and, via a CMISE/CMIP to a ROSE. These protocols are, in turn, linked to the presentation and session layers, and thence via the transport layer, using the following protocols, RFC1006, TCP and IP, to layer 2 service providers. On the other hand, a MIB is linked directly via a SNMP, to the transport layer which uses the following protocols, UDP and IP, and thence to the layer 2 service providers. This illustrates how network complexity inflation can occur.

By way of contrast, the protocol architecture of the present invention is illustrated in FIG. 3. In this case, the administrative and security parts on one of the two MIBs is reused in the other MIB. One MIB is linked to an ACSE and, via a CMISE/CMIP, to a ROSE, in a similar manner to that described with respect to FIG. 2. The ROSE and ACSE are then linked to a serializer and thence, via the system solution of the present invention, to a SNMP. The second MIB can be linked directly to a SNMP, or via the system solution to the serializer. Both MIBs are then linked, via the transport layer, using a UDP and IP, to a layer 2 service provider such as ATM.

There are two main underlying protocols of pertinence to CMIP: ACSE and ROSE. The user, e.g. the manager, of the CMIP Service Element (CMISE), typically establishes an association with another CMISE user, e.g. an agent. The association specifies a presentation context that includes ROSE and, in some cases, also other application service elements.

Figure 4:
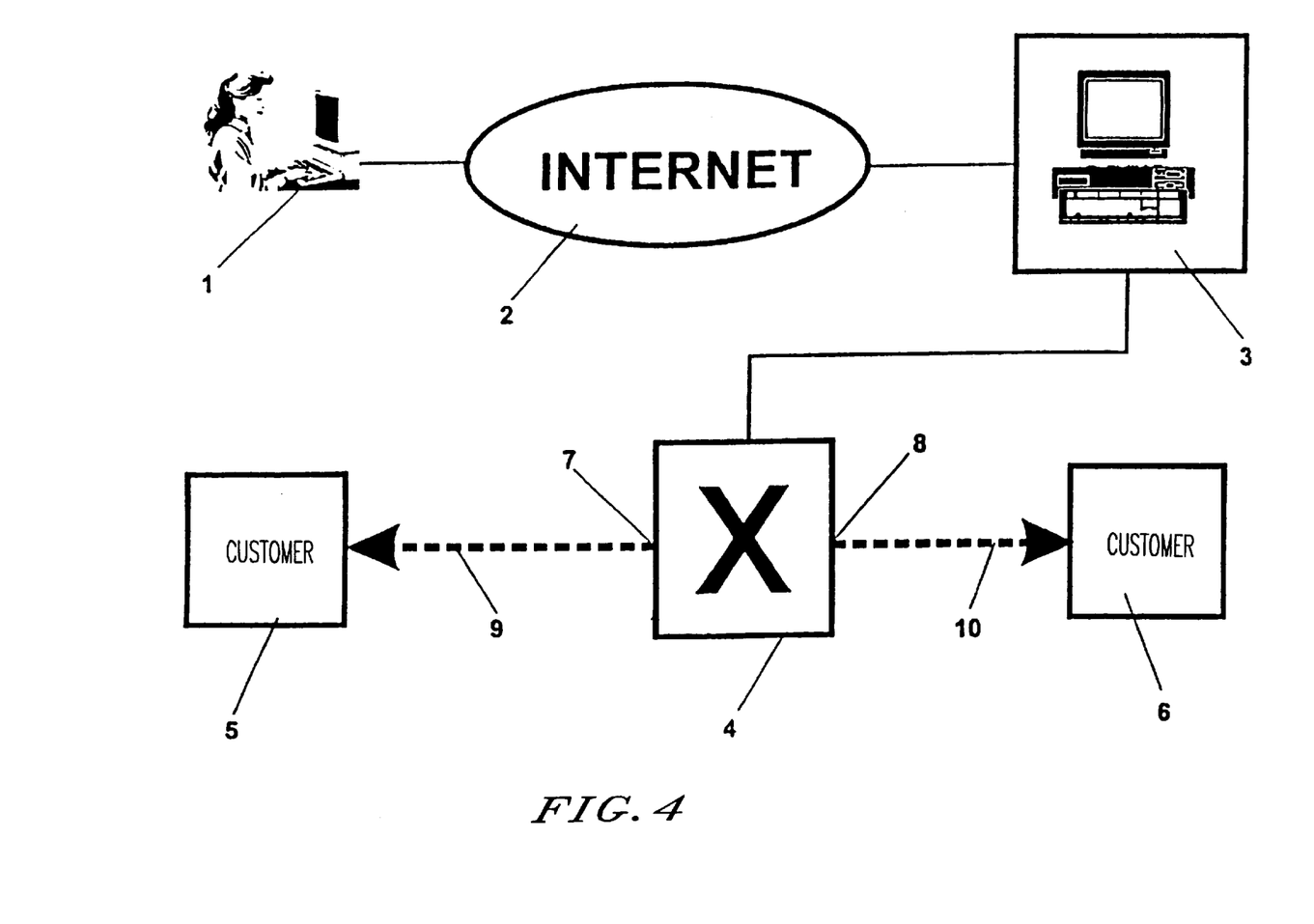
FIG. 4 illustrates the use of a network management system to set up an ATM connection between two subscribers.

Referring now to FIG. 4, there is shown the connection between a Telia operator, 1, and an ATM switch, 4. The Telia operator, 1, is linked via the Internet, 2, to the NMC, 3, for Göteborg. The NMC for Göteborg is linked to the ATM switch for Göteborg. A first port, 7, of the ATM switch 4, is linked, 9, to a customer, 5, located in Stockholm, by a VP having VPI "42". A second port, 8, of the ATM switch 4, is linked, 10, to a customer, 6, located in Malmö, by a VP having VPI "43". A stream of ATM cells are routed between customer 6 and customer 5, via ATM switch 4. System control is effected, by the operator, through the following steps:

1. The Telia operator establishes an association with the NMC, 3, controlling ATM switch, 4, and specifies that CMISE and ROSE will be used as presentation contexts, by sending the following "A ASSOCIATE.request":
   Application-context-name="CMIP+ROSE"
   Calling-AP-title="Telia-OSI-Manager-i-Farsta"
   Called-AP-title="Telia-QSI-Agent-i-Göteborg".
2. The NMC, 3, acknowledges the request by sending the following "A_ASSOCIATE.response":
   (Accept).
   There is now a management association between the manager and the agent that controls the switch/cross-connect.
3. The operator now issues an M-action command to establish a connection between customers 5 and 6 who may be on two ends of a corporate network. The M-action command takes the form of an "M-ACTION.request" in the following form:
   BaseObjectClass=atmFabric
   ActionType=connect
   ActionInformation=vpcCTPBid142, vpCTPBid243
   The "M-ACTION.request" is mapped onto ROSE and then serialized before being sent over the OSI presentation/session/transport layers as "RO-INVOKE.request (M-ACTION)".
4. The ROSE invocation is received by the agent and passed to a CMIP as "RO-INVOKE (M-ACTION)".
5. The CMIP issues an "M-ACTION.indication" in the form:
   BaseObjectClass=atmFabric
   ActionType=connect
   ActionInformation=vpcCTPBid142, vpCTPBid243
   The agent now issues an order to the switch to cross-connect ports so as to establish a path between customers 5 and 6.

Over ROSE, the CMISEs, on both sides of the manager/agent border, exchange service requests and responses, e.g. to create a cross-connect object on an ATM switch, or to collect accounting information from a particular connection to which a customer has subscribed. The implementation of ACSE over SNMP is the subject of another systems solution and is not covered by this patent application. For the purposes of the present invention, it may be assumed that the implementation of ACSE over SNMP always exists, or that it is established out-of-band. Once an association has been established, CMIP works on top of ROSE, which in turn works on top of a serializer that transforms ASN.1 data structures from CMISE/ROSE to a string of octets according to BER.

With the systems solution of the present invention, once a string of octets has been produced by the serializer, the string is conveyed to the local SNMP service interface. This can be an agent, or manager interface. The means by which SNMP message exchanges, between agent and manager, is achieved is immaterial to this patent application since they can be of any type, e.g. GET, SET, TRAP, INFORM etc. The octet string comes with a MIB-tree reference, i.e. OID (Object ID) pertaining to the entity that produced it. For example, if the origin is CMISE/ROSE, then an OID could be "enterprise.telia.management.cmip over snmp". This OID is an entry to a set of variables and tables that play the role of repository of CMISE/ROSE generated octet strings.

Figure 5:
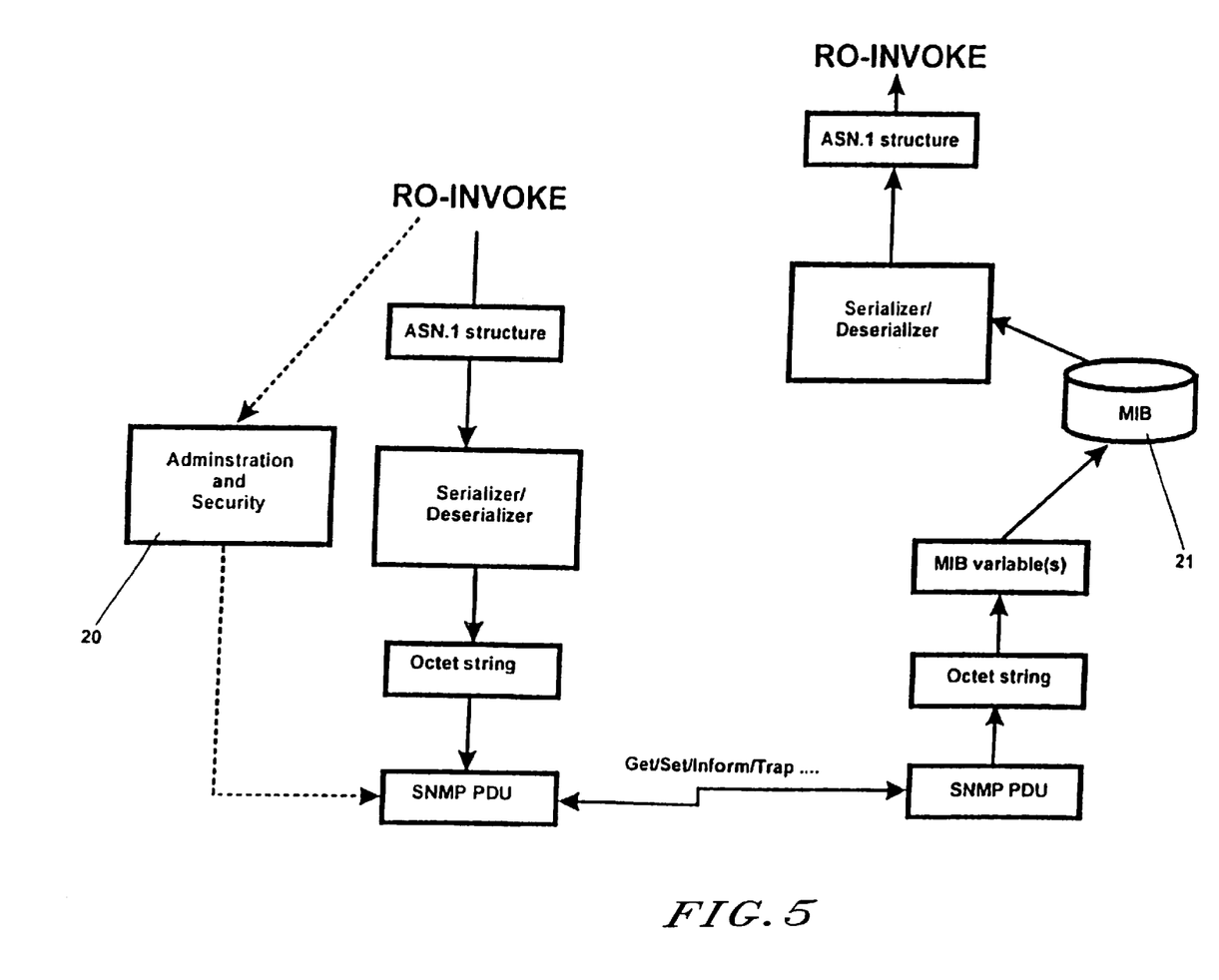
FIG. 5 illustrates a further aspect of the protocol architecture shown in FIG. 3.

Referring now to FIG. 5, there is illustrated, in diagrammatic form, the system solution of the present invention in which SNMP administrative and security frameworks are reused for CMIP. After serialization of a CMIP PDU, in the traditional manner, the octet string is passed to the lower parts of the presentation layer and thence to the session layer and other ISO layers. With the system solution, according to the present invention, the octet string is encapsulated into an SNMP PDU (version 1.5, or version 2) and sent to the agent.

A, for example, RO_INVOKE is put into an ASN.1 structure, see FIG. 5, and passed to the serializer/deserializer. The resultant octet string is then encapsulated in an SNMP PDU. The administrative and security framework, 20, maps the Application Process Title, e.g. "Telia-OSI-Manager-i-Farsta" to SNMP context and IP address. The SNMP PDU is then passed from the manager to the agent in the form of, for example GET, SET, TRAP, INFORM etc..

When the initiating CMISE side has identified the OID pertaining to the association and to a particular invocation, it writes the generated octet string into the MIB variable/table entry on the other side. This entry will function as a buffer for the octet string between serializer/deserializer and SNMP. Note that the current status of SNMPv2 is unstable, in particular with respect to the proposed security and administrative models as they stand today. However, this proposal bases its SNMP leg on SMI II (Specification of Management Information, the Internet slimmed-down version of ASN. 1) which can be considered very stable.

Typically, there could be one single table into which ROSE/CMISE octet strings are written. However, the present invention is not limited to the manner in which octet strings are written, but rather extends to all ways in which octet strings relating to ASN.1 serializers/deserializers are represented in the SNMP MIB. The table can be indexed through an assoc index (pertaining to the association) and an invocation index relevant to a particular transaction over the association. The elements of the table can also be stored once the association is deleted, e.g. to keep a record of events that occurred between manager and agent over the association. No matter what SNMPv2/v1.5 security mechanism is used, e.g. party-based, or user-based, there will be a possibility to relate the MIB-tree of an agent to access rights of a manager. Note, however, that the systems solution requires an integrity mechanism to be present in SNMP, in particular if UDP is used, since integrity checks will also function as protection against errors in the PDUs, see FIGS. 2 and 3.

Initially, most network elements in Telia's ATM/SDH network will be managed through SNMP. This is the situation at the present time. CMIP will be introduced as a vehicle for management information exchange between Telia and other operators. However, with the systems solution of the present invention, the initial costs of taking the step from SNMP to CMIP will be greatly reduced. Thus, the present invention, will enable a telecommunications operator to focus on the real benefits from OSI management, i.e. the systems management functions such as scheduling, accounting, log, testing etc. The same infrastructure that is now in place for SNMP will be used as an administrative and security tool to implement CMISE message exchanges.

What is claimed is:

1. A telecommunications system, comprising:

a network management center;

a plurality of network elements connected to said network management center, said network elements including Synchronous Digital Highway (SDH), Asynchronous Transfer Mode (ATM), and International Telecommunications Union (ITU) Signaling System NO. 7 (SS7), wherein for at least one of said plurality of network elements, network management data is transmitted, at least partially, over a link employing Common Management Information Protocol (CMIP) and Simple Network Management Protocol (SNMP); and a first and a second Common Management Information Service Element (CMISE) connected to said network management center, said first CMISE is adapted to establish an association with said second CMISE, said association specifies a presentation context, the SNMP based management protocols are reused as a transport mechanism for CMIP Protocol Data Units (PDUs);

the CMIP PDUs are serialized into octet strings, and the octet strings are encapsulated into SNMP PDUs for transmission;

said presentation context is Remote Operation Service Element (ROSE); and wherein with said association established, CMIP works on top of ROSE, which works on top of the process of serialization that transforms data structures from CMISE/ROSE into the octet strings.

2. A telecommunications system, as claimed in claim 1, wherein said octet strings produced by said serializer are conveyed to a local SNMP interface which can be either a manager or an agent.

3. A telecommunications system, as claimed in claim 2, wherein said octet strings include a MIB-tree reference pertaining to said octet strings' origin, and said MIB-tree reference functions as an entry to a set of variables and tables acting as a repository for CMISE/ROSE generated octet strings.

4. A telecommunications system, as claimed in claim 3, wherein when an initiating CMISE side of a manager/agent border exchange service has identified a MIB-tree reference, pertaining to a particular association and invocation, it causes a generated octet string to be written into a MIB variable/table entry on the other side of a manager/agent border exchange service.

5. A protocol network architecture, for transmission of network management data, comprising:

a Common Management Information Protocol (CMIP); and a Simple Network Management Protocol (SNMP), wherein the SNMP based management protocols are reused as a transport mechanism for CMIP Protocol Data Units (PDUs), the CMIP PDUs are serialized into octet strings, and the octet strings are encapsulated into SNMP PDUs;

the octet strings include a Management Information Base (MIB)-tree reference;

the process of serialization transforms Common Management Information Service Element/Remote Operation Service Element Abstract System Notation One (CMISE/ROSE ASN.1) data structures into a string of octets;

a first CMISE is adapted to establish an association with a second CMISE, said association specifies a presentation context;

said presentation context is ROSE; and the CMIP works on top of ROSE, which works on top of the process of serialization that transforms the data structures from CMISE/ROSE to the octet strings.

6. A protocol network architecture, as claimed in claim 5, wherein said octet strings produced by said serializer are conveyed to a local SNMP interface which can be either a manager or an agent.

7. A protocol network architecture, as claimed in claim 6, wherein said octet strings include a MIB-tree reference pertaining to said octet strings' origin, and said MIB-tree reference functions as an entry to a set of variables and tables acting as a repository for CMISE/ROSE generated octet strings.

8. A method of managing a telecommunications system, said telecommunications system including a first and a second Common Management Information Service Element (CMISE), a network management center, and at least one network element, wherein network management data is transmitted, at least partially, over a link employing Common Management Information Protocol (CMIP) and Simple Network management Protocol (SNMP), comprising the steps of:

reusing SNMP based management protocols as a transport mechanism for CMIP Protocol Data Units (PDUs);

serializing CMIP PDUs into octet strings;

encapsulating the octet strings into SNMP PDUs for transmission;

establishing an association with said second CMISE by said first CMISE; and specifying a presentation context by said association;

specifying said presentation context as Remote Operation Service Element (ROSE);

enabling the CMIP working on top of the ROSE, once said association is established; and enabling the ROSE working on top of a serialization process that transforms data structures from CMISE/ROSE into the octet strings.

9. A method, as claimed in claim 8, further comprising the step of conveying strings of octets produced by said serialization process to a local SNMP interface which can be either a manager or an agent.

10. A method, as claimed in claim 9, further the steps of:
including a MIB-tree reference pertaining to said octet strings' origin in said octet strings;
enabling said MIB-tree reference functioning as an entry to a set of variables and tables; and
enabling said MIB-tree reference acting as a repository for CMISE/ROSE generated octet strings.

11. A method, as claimed in claim 10, further comprising the steps of:
initiating a CMISE side of a manager/agent border exchange service;
identifying a MIB-tree reference pertaining to a particular association and invocation; and
causing a generated octet string to be written into a MIB variable/table entry on the other side of a manager/agent border exchange service.

* * * * *